(12) United States Patent
Girdhar

(10) Patent No.: US 10,846,691 B1
(45) Date of Patent: Nov. 24, 2020

(54) MULTI-ELEMENT OWNERSHIP OBJECT FOR SECURE TRANSACTION PROCESSING

(71) Applicant: Amazon Technologies, Inc., Seattle, WA (US)

(72) Inventor: Sachin Girdhar, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 294 days.

(21) Appl. No.: 16/031,882

(22) Filed: Jul. 10, 2018

(51) Int. Cl.
*G06Q 20/38* (2012.01)
*G06Q 30/02* (2012.01)

(52) U.S. Cl.
CPC ....... *G06Q 20/387* (2013.01); *G06Q 30/0222* (2013.01)

(58) Field of Classification Search
CPC .................. G06Q 20/387; G06Q 30/0222
See application file for complete search history.

(56) References Cited

U.S. PATENT DOCUMENTS

| | | | | |
|---|---|---|---|---|
| 2011/0029430 A1* | 2/2011 | Norris | ............. | G06Q 20/10 705/39 |
| 2015/0254699 A1* | 9/2015 | Bondesen | ............. | G06Q 20/385 705/14.17 |

OTHER PUBLICATIONS https://community.ebay.com/t5/Archive-My-Account-Q-A/2-eBay-accounts-with-the-same-credit-card/qaq-p/26013667 (Year: 2016).*

* cited by examiner

*Primary Examiner* — Sam Refai
*Assistant Examiner* — Kyle G Robinson
(74) *Attorney, Agent, or Firm* — Kilpatrick Townsend & Stockton LLP

(57) ABSTRACT

Techniques for a secure and flexible distributed job processing between a transaction network of a service provider and a processing endpoint of an entity are described. In an example, a transaction instrument may be used for a transaction and may be registered with the processing endpoint based on a transaction account. The transaction network may store an ownership object associating a token corresponding to the transaction instrument, a user identifier unique to a user account, and a provider identifier unique to the transaction account. The transaction network may identify a membership status of the user account and may customize the transaction based on this status. The transaction, as customized, may be completed by sending the provider identifier and data about the customization to the processing endpoint.

20 Claims, 8 Drawing Sheets

MULTI-ELEMENT OWNERSHIP OBJECT
FOR SECURE TRANSACTION PROCESSING

BACKGROUND

In a networked computer environment, a computing job may be distributed across various computing nodes. Generally, the configuration of the computing nodes may affect the security and processing latency of performing the job. In an example, a set of the computing nodes is managed by a service provider, while another set of the computing nodes is managed by another entity. In this example, each of the service provider and entity may configure its respective computing nodes to perform a portion of the job. For the job to be securely and quickly performed, proper information exchange should occur between the computing nodes.

Consider an illustrative example of a networked computer environment for processing transaction data. This environment may include a transaction network of the service provider and a processing endpoint of the entity. In this example, the transaction network manages transactions of users based on user accounts registered with the service provider. In comparison, the processing endpoint manages transaction accounts registered with the entity. In this way, a user may rely on his or her user account for an online transaction at a web site without having to enter information about his or her transaction account. The transaction network sends particular data about the transaction to the processing endpoint that then, for instance, authorizes the transaction. As such, the overall security is improved by avoiding the need to enter the information about the transaction account at the web site.

To maintain a high security level and a low processing latency, the distribution of the job may limit how flexible the association between the user account and the transaction account can be. In particular, updating the association can be subject to security and processing risks depending on the update.

BRIEF DESCRIPTION OF THE DRAWINGS

Various embodiments in accordance with the present disclosure will be described with reference to the drawings, in which.

DETAILED DESCRIPTION

Figure 1:
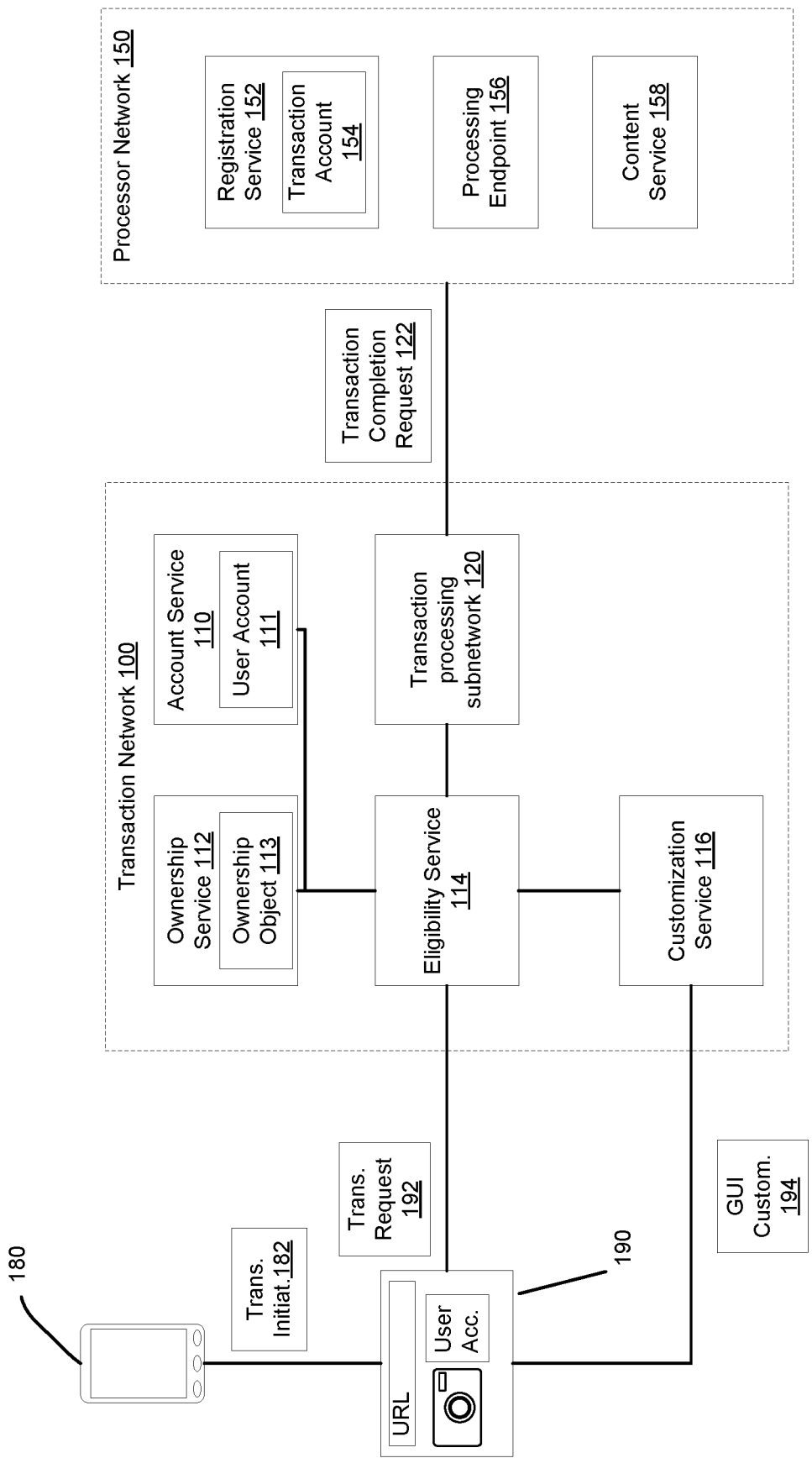
FIG. 1 illustrates an example of a networked computer environment for processing a transaction, according to an embodiment of the present disclosure.

In the following description, various embodiments will be described. For purposes of explanation, specific configurations and details are set forth in order to provide a thorough understanding of the embodiments. However, it will also be apparent to one skilled in the art that well-known features may be omitted or simplified in order to not obscure the embodiment being described.

Embodiments of the present disclosure are directed to, among other things, improving the security and processing latency of a networked computer environment available for performing a job, while also improving the flexibility associated with performing the job. In an example, the job includes processing a transaction associated with a user. In this example, the networked computer environment may include a transaction network of a service provider and a processing endpoint of an entity. The user may have a user account registered with the service provider. The user may operate a computing device and log in a network resource of the service provider by using the user account and may then initiate the transaction. The transaction network may determine that the user account is associated with a token stored within this network and that this token is associated with (a) a second user account registered with the service provider and (b) a transaction account registered for the second user account with the entity. Further, the transaction network may also identify a membership status of the second user account with the service provider. Based on a qualification rule, the transaction network may determine that the membership status would qualify the second user account to a particular offer if the token is used to complete the transaction. Information about the offer are presented at the user device with a selection option. The user, still logged in with his or her user account, may select the option. In turn, the transaction network may exchange, with the processing endpoint, relevant data about the transaction, the selected offer, and the transaction account associated with the second user account. Upon completion of this transaction, the transaction account associated with the second user account may be updated based on the selected offer.

To illustrate, consider an example of an online purchase charge for a user who is employed by a business. The user may have a first user account registered with the service provider. Similarly, the business may have a second user account also registered with the service provider, where this second user account may have a particular membership status with the service provider. In addition, the entity may have issued a credit card to the business, where this credit card corresponds to a transaction account registered with the entity for the business. The business may access the transaction network and claim ownership of the credit card by associating this card with the second user account. In comparison, the user may access the transaction network and add this credit card to his or her first user account to support online purchases made by the user on behalf of the business. Accordingly, the transaction network may generate an ownership object that stores a token corresponding to the credit card, a user identifier specific to the second user account, and a provider identifier specific to the transaction account with the entity. The transaction network may also update the first user account by including an association with the token. As such, the ownership object indicates that the credit card is owned by the business, whereas the association in the first user account indicates that the credit card is available to the user.

In this example, the user may visit a web site, add items to an online cart, and initiate a checkout process by logging in to his or her first user account. In response, the transaction network may identify the token based on the association in the first user account. The transaction network may then look up an ownership database storing ownership objects and determine that the token is associated with the second user account. Next, the transaction network may look up a membership database storing membership statuses for user account and determine that the second user account has the particular membership status. Further, the transaction network may look up an offer database storing offers available to token, apply a qualification rule that specifies needed membership statuses to receive offers, and determine that the particular membership status qualifies the second user account to a particular offer if the token is used to complete the online purchase. This offer and a selection option may then be presented in a checkout web page to the user. Upon receiving the selection, the transaction network may generate and send, among other things, a code specific to the selected offer and usable by the entity's processing endpoint and the provider identifier from the ownership object. The processing endpoint may receive this data and complete the transaction including, for example, updating the transaction account of the business with the benefits of the offer selected by the business' employee.

As one skilled in the art will appreciate in light of this disclosure, certain embodiments may be capable of achieving certain advantages, including some or all of the following: improved security (e.g., by using tokens instead of credit card information), reducing network latencies (e.g., by pre-computing particular user qualifications), and improved flexibility (e.g., by providing the capability of associating a single credit card with multiple user accounts and a single user account with multiple credit cards, and by providing dynamic graphical user interfaces to support this capability and to provide selection options). The embodiments also enable a simplified user interface (e.g., a graphical user interface) to be provided (e.g., during checkout) with low latency. These and other advantages are further illustrated in the accompanying description of the figures, as further described herein below.

In the interest of clarity of explanation, embodiments of the present disclosure are described in connection with an online purchase using a credit card. However, the embodiments are not limited as such. An online purchase is an example of a transaction and a transaction is an example of a job that may be distributed across various computing networks of a networked computer environment. As such, the embodiments similarly apply to any job and/or transaction that may be performed within the network computer environment that includes processing engines and plugins. In addition, a credit card is an example of a transaction instrument and a transaction instrument is an instrument that supports the processing of a transaction or a job. As such, the embodiments similarly apply to any other type of a transaction instrument including, for instance, gift cards, reward points, cryptocurrency, and the like.

FIG. 1 illustrates an example of a networked computer environment for processing a transaction, according to an embodiment of the present disclosure. As illustrated, this environment includes a transaction network 100 of a service provider, a processor network 150 of an entity, and a computing device 180 of a user. A transaction initiated from the computing device 180 may be processed through the transaction network 100 and the processor network 150. For instance, the transaction may be an online purchase from a web site 190 and the processing may involve authorizing the online purchase followed by a settlement of the related charge. Of course, online transactions via a web site is only an illustrative example of a transaction. The embodiments of the present disclosure similarly apply to other types of transactions, such as one initiated via a point of sale device in a brick and mortar store.

In an example, the entity operates the processor network 150 to manage credit cards for end users. The processor network 150 may include a registration service 152, a processing endpoint 156, and a content service 158. An end user may access the registration service 152 via a web page accessible to a graphical interface of a computing device over a network (or via other means), and may request a credit card. The registration service 152 may qualify the end user to the credit card and may generate and store a transaction account 154 associated with the credit card. Transaction data related to the credit card may be received by the processing endpoint 156. In turn, this endpoint 156 may authorize charges to the credit card, complete settlements based on the transaction account 154, and perform other transaction related functions (e.g., reimbursements, record updates). The content service 158 may customize content provided to the end user when accessing the transaction account 154. For instance, the access may be through a web page of the entity, and the content service 158 may show specific branding in the web page.

Accordingly, the processor network 150 may be part of a system of the entity, where this system may be configured as a credit card payment processing system, an automated clearinghouse ("ACH"), or another type of system for providing a payment approval or guarantee for the end user. Generally, the processor network 150 may include a plurality of computing nodes hosting the registration service 152, the processing endpoint 156, and the content 158 service and other services to process and complete aspects of a transaction (e.g., to provide the payment authorization or guarantee, settlement, reimbursements, record updates, etc.).

In an example, the service provider operates the transaction network 100 such that end users can conduct transactions (e.g., online purchases) with user accounts registered with the transaction network 100. The transaction network 100 may be configured as an intermediary between an end user and the processor network 150, where the end user relies on a user account with the transaction network 100, and the transaction network 100 may complete the transaction with the processor network 150 for the end user based on his or her transaction account with the processor network 150. The transaction network 100 and the processor network 150 are separate physically and logically. In addition, the computing device 180 connects to a network and the web site 190 is hosted on a network, where these two networks and the transaction network 100 can be separate physically and logically. The transaction network 100 may facilitate checkouts on the web site 190 so that the web site 190 does not need to maintain its own user account and checkout system.

The transaction network 100 may include computing nodes that host an account service 110, an ownership service 112, an eligibility service 114, a customization service 116, and a transaction processing subnetwork 120, among other components as further described in the next figure. An end user may access the account service 110 via a web page accessible to a graphical interface of a computing device over a network (or via other means), and may and register a user account 111 with the transaction network 100. Access to the user account may be managed via a username and password. The user account may store information about the user (e.g., location), purchase history, and available tokens to complete online purchases. Each of the tokens may correspond to a credit card.

The ownership service 112 may allow an end user that has a user account with the transaction network 100 to define ownership of a credit card. Ownership need not be the same as the name on the credit card and need not be limited to one end user. In particular, the entity may have issued a credit card to a first user. That first user and/or a second user may invoke the ownership service 112 to claim ownership of that card for transactions processed by the transaction network 100. To illustrate, the credit card may be issued to a business that has a first user account. A representative of the business may use the ownership service 112 to declare that the credit card is owned by the business. Similarly, an employee of the business may also use the ownership service 112 to declare that the credit card is owned by the employee. In other words, each end user (e.g., whether the business or the employee) may claim ownership over the same credit card, to multiple credit cards and each credit card may be owned by one or more end users.

In turn, the ownership service 112 may generate an ownership object 113 that identifies the credit card and the owner. In an example, the ownership object 113 may be a data structure storing three elements. The first element may be the token of the credit card. The second element may be a unique identifier of the end user claiming the ownership (e.g., a unique identifier of this user's user account with the transaction network 100), where this identifier may be available to and usable by only the transaction network 100 (e.g., facilitates identifying the user account). In the interest of clarity of explanation, this user account is referred to herein as an "owner account." In other words, the owner account is a user account registered via the account service 110 and claiming ownership of a credit card via the ownership service 112. The third element may be a unique identifier of the user's transaction account, where this identifier may be available to and usable by both the transaction network 100 and the processor network 150 (e.g., facilitates identifying the transaction account). For instance, the ownership object 113 is set as <token, user ID, transaction account ID>. Other types of data structure for storing the ownership object 113 are possible including, for example, arrays, lists, enumerations, and the like. The use of an ownership object 113 and the difference relative to a user account will become more apparent once use cases are illustrated, as further described herein below.

The eligibility service 114 may determine whether an owner account associated with a transaction may qualify for an offer when a particular token is used and based on a membership status of the user account. As further illustrated in FIG. 2, the eligibility service 114 may identify, for a user involved in a transaction, a token from the corresponding user account and may use the token to determine one or more ownership objects and the owner account identified in each object. Based on the membership of an identifier owner account, the eligibility service 114 may qualify that owner account to an offer.

The customization service 116 may customize content for a user accessing services of the transaction network 100, illustrated as GUI customization 194. Some of the customization 194 may be based on the qualification provided by the eligibility service 114 and/or the membership status. For instance, targeted content (e.g., advertisement) may be displayed in an information web page about an item upon a determination that an end user is associated with a particular membership status. This content may provide information about a token that the user may use to qualify for an offer and take advantage of the particular membership status. In another illustration, targeted content (e.g., branding) may be displayed in a checkout web page upon a qualification from the eligibility service 114. This content may show brand-related information about the particular membership status and/or the entity responsible for the corresponding token.

In an example, the customization service 116 may allow a simplified user interface (e.g., a graphical user interface) to be provided (e.g., during checkout) with low latency. For instance, in existing systems, transaction accounts (e.g., credit) cards show up in a user account with generic descriptions, such as credit card ending in 1234. In comparison, in a system implementing that uses the customization service 116, the graphical user interface enables a simplified and streamlined definitions of ownerships. As such, additional information provided in the graphical user interface enables users to more efficiently locate, and navigate to, what they are looking for and allows them to navigate to the associated information with fewer clicks, taps, or other interactions (e.g., what card should be used for this transaction).

The transaction processing subnetwork 120 may include computing nodes hosting various other services to, among other things, securely initiate and complete a transaction with processing endpoint 156. For instance, during a checkout process for an online purchase of an end user, the transaction processing subnetwork 120 may request and receive authorization of the online purchase from the processing endpoint 156 and may accordingly generate a transaction record for the online purchase. This record may store offer-related data. Subsequently, the transaction processing subnetwork 120 may request a settlement for the charge of the online purchase from the processing endpoint 156. The authorization and settlement requests are illustrated as a transaction completion request 122.

To illustrate the use of an ownership object and a user account, two examples are described herein next. In the first example, an employee who has a user account can use a credit card having an ownership associated with a business. In the second example, a customer who has a user account can use a credit card having an ownership also associated with the customer. Of course, other use cases are possible.

In the first example, the employee operates the computing device 180 to interact with the web site 190 offering items for sale. This web site may belong to the service provider or to another party. The user may add a camera to an online cart and may enter a username and password at the web site 190 to login in to the employee's user account, authenticate the user, and initiate a purchase transaction 182. Other ways to initiate a transaction may be possible. For instance, the computing device 180 may include an application that provides an interface to a network resource offering the items for sale.

The transaction network 100 may receive a transaction request 192 originating from the web site 190. This request 192 may be received from a web server hosting the web site 190 or an ordering system communicatively coupled with the web server. The transaction request 192 may identify the employee's user account, the item purchased, the purchase amount, and the web site 190.

In response, the transaction network 100 may look up the employee's user account and determine that a token corresponding to a credit card is available for the online purchase.

Next, the transaction network 100 may identify an ownership object from the ownership objects by matching the token to the token stored in the ownership object. From this object, the transaction network 100 may identify an owner account corresponding to the business and may determine that this owner account has an elevated membership status. Accordingly, the transaction network 100 may determine that the owner account would qualify for an offer (e.g., five percent cash back) if the token is used for the online purchase. Information about this offer may be displayed at a checkout web page of the web site 190. Upon a selection thereof, the transaction network 100 may authorize and settle the online purchase with the processing endpoint 156. The authorization and settlement may include transmitting the provider identifier from the ownership object to the processing endpoint 156 to identify the business' transaction account registered with the processor network 150. In this way, the transaction account of the processor, rather than of the employee, may receive the benefits of the offer.

In the second example, the transaction may be initiated from the computing device 180 in a similar manner, whereby the customer logs in to the web site 190 for the checkout process. The transaction network 100 may identify a token available for the online purchase based on the customer's user account. This token may correspond to a particular credit card registered for the customer with the processor network 150. Next, the transaction network 100 may determine the applicable ownership object and identify that the owner account is the same as the user account. Based on the membership status of this user account indicating that the customer does not have the elevated membership status, the transaction network 100 may qualify the customer for a different offer (e.g., three percent cash back). Here also, upon a selection of the offer, the transaction network 100 may authorize and settle the online purchase with the processing endpoint 156 and the customer's transaction account may receive the benefits of the offer.

An extension to this second example is the illustrative case where another end user subsequently claims ownership of the particular credit card. This end user may have the elevated membership status. The transaction network 100 may generate a corresponding ownership object identifying the token, the end user's user account, and a provider identifier. The token and provider identifier may remain the same because the credit card did not change and is still registered for the customer's transaction account. Only the user account may have changed, where the second element identifies in this ownership object the user account of the end user instead of the customer. When the customer performs another online transaction, the transaction network 100 would identify that the token is associated with the end user's user account that has the elevated membership status. Accordingly, a corresponding offer (e.g., five percent cash back) may be made to the customer and upon selection thereof, the customer's transaction account may now receive the five percent benefit of the offer. Hence, by changing the ownership, the flexibility of qualifying to different offers may become possible without the complexity and the security risk of having to drive changes to the token or other credit card-related data.

Figure 2:
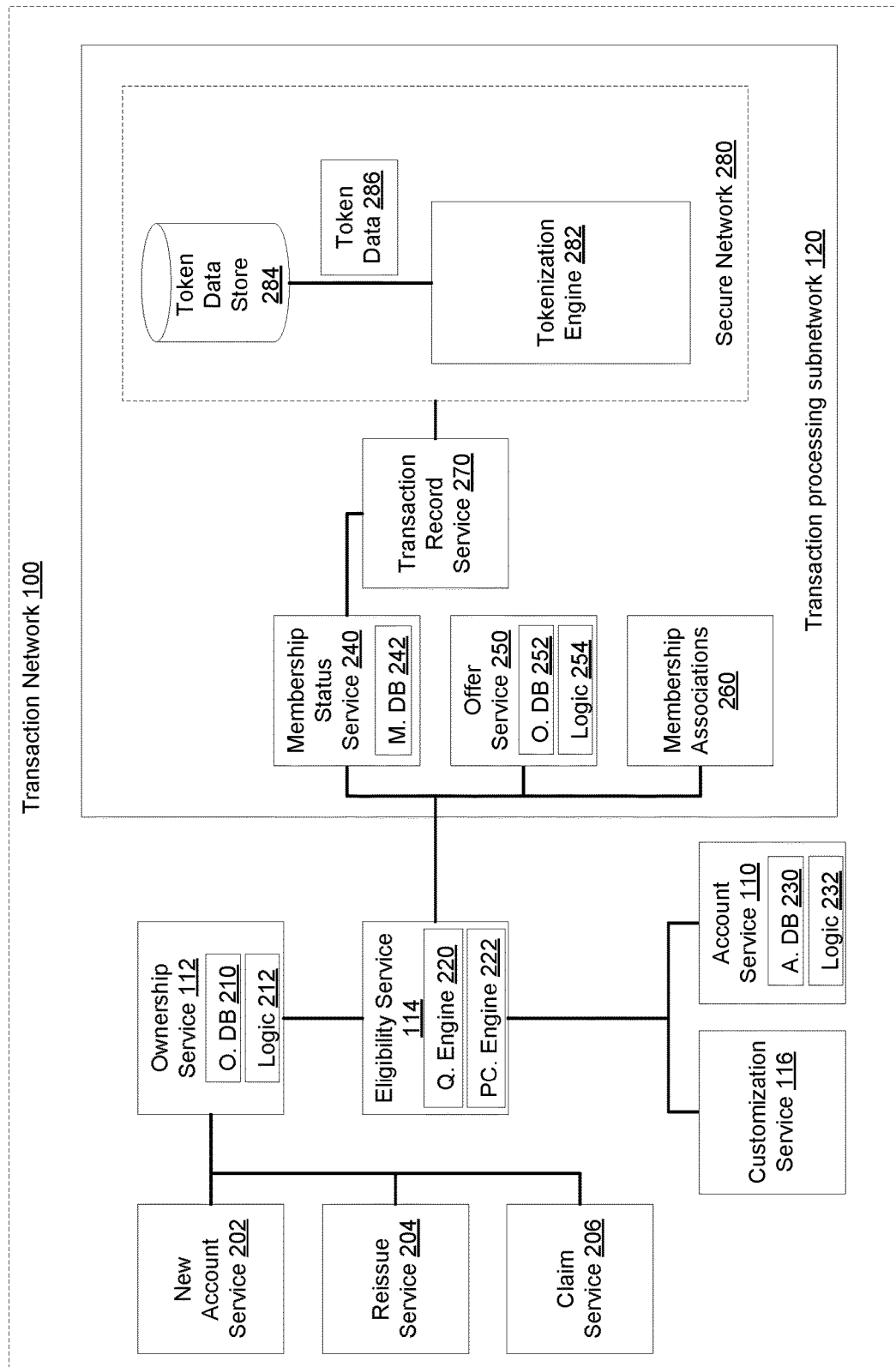
FIG. 2 illustrates examples of components of a transaction network, according to an embodiment of the present disclosure.

FIG. 2 illustrates examples of components of the transaction network 100, according to an embodiment of the present disclosure. As illustrated, the transaction network 100 may include a plurality of computing nodes hosting different services. These services include a new account service 202, a reissue service 204, and a claim service 206 that generally allow an end user to apply for a new transaction account (e.g., a new credit card) and a new user account, an entity to reissue a credit card, and an owner to claim ownership over a credit card for transactions facilitated by the transaction network 100.

In particular, a web page may be supported by each of these services 202-206 and may be accessible via the GUI. A web page for the new account service 202 may receive user input requesting a new credit card and/or a new user account. The request for a new credit card may be passed to a processor network and the response back may be displayed on the web page. If the new credit card is issued, the new account service 202 may generate and send a provider identifier to the processor network. The request for a user account may be processed by the account service 110 to add a new user account. In an example, the ownership service 112 may allow, via this web page, the end user to claim ownership of the new credit card. If so, the ownership service may generate a new ownership object.

A web page for the reissue service 204 may receive entity input identifying a newly reissued credit card for an existing transaction account, where this input may include the provider identifier applicable to this existing transaction account. The transaction network 100 may generate a token for the reissued credit card as needed and the ownership service 112 may update ownership objects accordingly.

A web page for the claim service 206 may receive owner input requesting or changing (e.g., adding, deleting, updating, or removing) ownership over a credit card for transactions facilitated by the transaction network 100. The request for the ownership may be processed by the ownership service 112 to generate or update an ownership object as applicable.

As explained in connection with FIG. 1, the computing nodes of the transaction network 100 also host the ownership service 112, the eligibility service 114, and the query engine 220. The ownership service 112 may maintain an ownership database 210 that includes database entries. Each of these entries may correspond to an ownership object and may associate a token, a user identifier, and a provider identifier. In addition, the ownership service 112 may run ownership logic 212 to maintain the entries and generate query results from the ownership database 210 in response to queries from the eligibility service 114 about ownership information.

In an example, the ownership database 210 may store current ownership objects and historical ownership objects. The current ownership objects may store current associations of tokens, user identifiers, and provider identifiers usable to identify current ownerships and support an offer service 250. The historical ownership objects may store historical associations of tokens, user identifiers, and provider identifiers that were previously usable to the offer service 250 but are no longer so because of changes to ownerships. The current ownership objects and historical ownership objects may be stored in two separate tables, thereby allowing the ownership logic 212 to only process the current ownership objects in support of the offer service 250 and to only process the historical ownership objects to return query results about historical ownerships. In this way, the latency for on demand determination of ownerships and offer qualifications is reduced because only the latest and relevant owner records are read from the current ownership object table. The use of two tables also brings separation of concern for both current and historical usage clients, where getting all history can sometime be time consuming so clients who are reading history should never have indirect effect on current usage clients.

The account service 110 may maintain an account database 230 that includes database entries. Each of these entries may correspond to a user account and may store information about the corresponding end user and/or the account itself including, for example, the user identifier and tokens available for use for transactions to be processed on behalf of the user account. In addition, the account service 110 may run account logic 232 to maintain the entries and generate query results from the account database 230 in response to queries from the eligibility service 114 about account information.

The eligibility service 114 may implement a query engine 220 and a pre-compute engine 222. The query engine 220 may query in real-time (e.g., during a checkout of a user) the account service 110, the ownership service 112, and other services (as further described herein below) over application programming interface (APIs) of these services to determine whether a user account qualifies for an offer available to a token based on a membership status. If multiple services are queried, the query engine 220 may combine the query results. The pre-compute engine 222 may generate in near real-time (e.g., as soon as a trigger event is detected) pre-computed results to alleviate as much as possible processing latency associated with using the transaction network 100. An example of the pre-computed results include membership associations 260 that are further described herein below.

As also illustrated in FIG. 1, the transaction network 100 may include a transaction processing subnetwork 120 that, in turn, includes a number of computing nodes hosting different services. Among the services of the transaction processing subnetwork 120 are a membership status service 240, the offer service 250, and a transaction record service 270.

The membership status service 240 may maintain a membership database 242 that includes database entries. Each of these entries may correspond to a user account and may store the user identifier and membership status of the user account. In addition, the membership status service 240 may run membership logic (not shown) to maintain the entries and generate query results from the membership database 242 in response to queries from the eligibility service 114 about membership information.

The offer service 250 may maintain an offer database 252 that includes database entries. Each of these entries may correspond to a token, and may store the token, information about an offer available when the token is used in a transaction, and offer identifier that is unique to the offer and that is usable by the transaction network 100 for the processing of the transaction. In addition, the offer service 250 may run offer logic 254 to maintain the entries and generate query results from the offer database 252 in response to queries from the eligibility service 114 about offer information. This logic 254 may encode qualification rules that can be set by the service provider or an entity associated with tokens (e.g., the entity that issued the credit cards). A qualification rule may specify particular parameters to be met, such a particular membership status, to qualify for a particular offer. The query results may use such qualification rules to provide an offer identifier to the eligibility service 114 in response to a query that includes a token and a membership status. Upon a selection of an offer to be used in processing a transaction, the offer logic 254 may also output the corresponding offer identifier to the transaction record service 270 to use this offer identifier in a record of the transaction.

For a transaction under processing, the transaction record service 270 may receive an applicable offer identifier (e.g., one that has been qualified) from the membership status service 240. In response, the transaction record service 270 may generate or update a record to include the offer identifier. This record may be stored in a record database (not shown). During settlement, the transaction record service 270 may also translate the offer identifier into a code that is usable by the processing endpoint to complete the settlement based on the benefits provided by the offer. For example, the transaction record service 270 may maintain a database (not shown) that associates offer identifiers with codes.

The membership associations 260 may represent pre-compute results stored within the transaction processing subnetwork 210. Various types of pre-compute results may be available. In one example type, a membership association may show whether a user account is associated with a particular membership status or not. In particular, that user account may not be registered as having the particular membership status. Instead, the user account may store a token and that token may in turn be associated with an owner account in the ownership database 252. If that owner account is associated with the particular membership status (e.g., which is an output of the membership status service 240), the membership association would show that the user account is also associated with the particular membership status despite what the membership database 242 is showing otherwise. This type of membership association may be pre-computed to support customizing content by the customization service. The pre-computing may reduce the latency of deriving this association in real time while the user account is being used during a browsing session.

Another example type of pre-compute results, a membership association may show whether a provider identifier is associated with the particular membership status. This association may be derived by using the provider identifier to query the ownership database 210 and determine the user identifier from the applicable ownership object and by using the user identifier to query the membership database 242 and determine the applicable membership status. This type of membership association may be pre-computed and sent to the processor network to support customizing content by the processor network.

In an example, the transaction processing network 120 may also include a secure network 280 to manage tokens associated with credit cards. The secure network 280 may include a set of computing nodes installed, for instance, within the secure virtual and physical zone (as illustrated with a dashed box around the secure network 280). These nodes 120 may host a tokenization engine 282 and a token data store 284 (e.g., may store a token database). The tokenization engine 282 may receive a record from the transaction record service 270 of a transaction under processing and may determine token data 286 from the token data store 284 based on the token included in the record. The token data 286 may include credit card information corresponding to the token (e.g., the credit card number) and/or other transaction account-sensitive data, which may be securely stored in the token data store 284. The tokenization engine 282 may then replace the token with the credit card information and may provide the credit card information and other transaction data from the record (e.g., purchase amount, item purchased, user name, provide identifier, code for the applicable offer, etc.) in a secure message to the processing endpoint. The response back from the processing endpoint may be to update and to replace any credit card information with the token and/or redact other transaction account-sensitive data and passed to the transaction processing record 270 to update the record according to the response (e.g., authorized, settled, etc.).

Hence, the transaction network 100 includes the offer service 250 and the ownership service 112. Each of these services manage a database that is within the transaction network 100 (e.g., the offer database 252 and the ownership database 210). An offer could be defined by the service provider of the transaction network 100, the entity of the processor network 150, or a third party. Once a transaction is qualified to the offer by the eligibility service 114, the offer service 250 generates an offer identifier that becomes part of the transaction record. The offer identifier may not be communicated to the entity but is instead translated to a partner code and send with the provider identifier, thereby enabling the processor network 150 to apply the offer to the relevant transaction account.

Although FIG. 2 illustrates the use of a membership status service 240 and a particular membership status to receive an offer, the embodiments of the present disclosure are not limited as such. Instead, an offer may become available absent or independent of the particular membership status. For example, the entity may define offers for transaction accounts registered with the processor network 150. In this case, the ownership service 112 may receive the provider identifiers of these accounts and the offers from the processor network 150 and may associate these offers with the applicable user accounts and store these offers and the associations in the ownership database 210. Upon a query from the eligibility service 114, the ownership logic 212 may return an offer identifier independent of the particular membership status. Hence, if the entity decides to offer, for instance, five percent cashback on a particular credit card, then the ownership service 112 may return an offer for five percent cashback in any transaction that uses the credit card and regardless of the membership status of a user that claims ownership over the credit card.

The transaction network 100 provides many technical advantages. First, processing a transaction is highly secured because of the use of tokens. In particular, credit card information and/or transaction account-sensitive data are not available outside of the secure network 280. Services of the transaction network 100 hosted outside of the secure network 280 use the tokens instead. Thereby, if a token is compromised, the credit card information and/or transaction account-sensitive data remain secured. Second, the pre-compute of particular results (e.g., the membership associations 260) may reduce the processing burden that should be performed in real-time, thereby resulting in a reduced latency when processing the real-time data. In addition, the pre-computed results can allow upgrades of ownerships to be reflected and used across different services in near real time (e.g., within a few seconds or minutes after a user updates, via a service provider's web page, his or her ownership associated with a transaction account at an entity, by logging to the transaction account at a web page of the entity, the user can see the change to the ownership). The latency can also be reduced by separating current ownership objects and historical ownership objects in two tables, as described herein above. Further, the ownership objects (e.g., as stored in the ownership database 210) provide significant flexibility without compromising the security. In particular, the ownership of a credit card can be updated dynamically, where adding, replacing, updating, or removing the ownership may be as simple as a database entry edit and may not necessitate exchange of credit card information or transaction account-sensitive data. In addition, the edits can be based on input of an end user at dynamic graphical user interfaces and need not necessitate involvement of a network administrator or a programmer, as further illustrated in the next figures.

Various techniques are available to enable the flexibility without comprising the security. In an example, a user cannot make a claim to an ownership of a credit card and, thus, an ownership object cannot be generated until the user has been verified as having low risk with respect to securely and properly using the credit card. For instance, the user may have a user account and computing session data, browsing data, and transaction history associated with the user account may be monitored to determine whether the user is a low risk or a high risk user. This monitoring may be performed in near-real time (e.g., as soon as there is new computing session data, browsing data, or transaction data), at predefined time intervals, or on demand. A database, such as the ownership database 210, may store a table that lists the user identifier unique to the user account and a flag indicating the risk (e.g., "L" for low risk and "H" for high risk). Upon a request of the user to claim the credit card, the database may be accessed, and the ownership object is generated only if the flag indicates a low risk. Furthermore, the flag may be maintained over time. If the user becomes a high risk user, the flag may be updated and the ownership object may be disabled accordingly (e.g., no longer usable for qualifying the user account to offers). Hence, the workflow to claim ownership, and generate and maintain an ownership object on its own may ensure that the ownership object is usable only in a secure and non-fraudulent manner. In another example, the ownership object may not be generated or may not become usable until after the user has successfully used the credit card at least once for a transaction (e.g., including an authorization and a settlement of the transaction). In this way, the successful use of the credit card indicates that the user is low risk.

Figure 3:
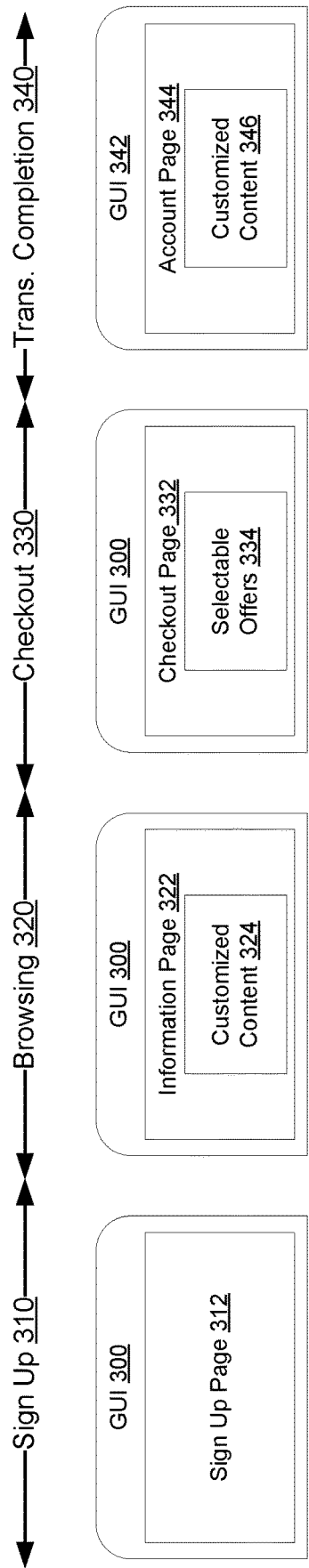
FIG. 3 illustrates examples of graphical user interfaces that support the processing of a transaction, according to an embodiment of the present disclosure.

FIG. 3 illustrates examples of graphical user interfaces that support the processing of a transaction, according to an embodiment of the present disclosure. In an example, an end user operates a computing device to establish a computing session and access a network resource, such as a web site. Web pages are presented via graphical user interfaces (GUIs) on the computing device to the end user during the computing session. The web pages may be customized depending on a stage of the computing session. The customized GUI support the flexibility of dynamically updating and using ownership of a credit card without creating a security risk.

Four stages of the computing session are illustrated in FIG. 3: a sign up stage 310, a browsing stage 320, a checkout stage 330, and a transaction completion stage 340. During the sign up stage 310, a GUI 300 may present a sign up page 312. This page 312 may be a web page that allows the end user to request a new credit card, a new user account, and/or claim or update ownership of an existing credit card. The new account service 202 and the claim service 206 of FIG. 2 may provide the functionality of the sign up page 312.

During the browsing stage 320, the GUI 300 may be updated to present an information page 322. This page 322 may be a web page, such as a home page, a detail page, etc. that provides information about items available for purchase from the web site. The browsing stage 320 may also allow the end user to virtually add one or more items to an online cart and to initiate a checkout process. During the browsing stage 320, the user account of the end user may be identified based on a login of the end user to the user account or on a cookie. A user authentication may also be performed based on a user name and password used during the login to the user account. A membership association may be pre-computed for the end user and may indicate his or her membership status based on an association with a credit card. For instance, this pre-compute result may be stored in the membership associations 260 of FIG. 2. The customization service 116 of FIGS. 1 and 2 may use the membership association to generate customized content 324 that is then presented in the information page 322 during the browsing stage 320. Examples of this customized content 324 are further described in connection with FIG. 4.

During the checkout stage 330, the GUI 300 may be updated to present one or more checkout pages, such as web pages that allow the end user to complete a checkout process and purchase (or return, cancel, etc.) items virtually added to the online cart. A particular checkout page 332 may present information about available credit cards (e.g., the last four numbers on a credit card, the name of the credit card's owner, the name of the issuing entity, etc.) and the selectable offer(s) 334 for each credit card based on ownership(s), membership status(es), and qualification rule(s). In an example, the eligibility service 114 of FIGS. 1 and 2 may identify a token for an available credit card by using a user identifier of the user account to query the account service 110 of FIGS. 1 and 2. The eligibility service 114 may also use the token to query the ownership service and identify the ownership (e.g., a unique identifier of the owner account) of this credit card. Further, the eligibility service may use the owner account's unique identifier to query the membership status service 240 of FIG. 2 and identify a membership status of the owner account and may use the membership status and the token to query the offer service 250 of FIG. 2. The offer service 250 may return a selectable offer(s) for the credit card based on the token, the membership status, and a qualification rule. The customization service 116 of FIGS. 1 and 2 may then customize the checkout page 332 to present the selectable offer(s) 334 including, for instance, presenting branding content (image of the credit card's owner, image of the issuing entity, etc.), a description of each selectable offer, and a selection option. Examples of the checkout page 332 are further described in connection with FIG. 5. Stringent processing latencies (e.g., less than a few milliseconds) may be observed to avoid an unacceptable latency between the end user invoking the checkout page 332 and loading the checkout page 332 including selectable offers 334. That may be possible based on the various logic being hosted by each service and the eligibility service's 114 capability of combining the received query results.

Once the checkout process is complete and the end user is informed that the online purchase was authorized, settlement of the purchase may occur and account for any selected offer. Typically, a few days later (e.g., within three days), the transaction account(s) corresponding to the authorized credit card(s) may be updated to show the benefits of the selected offer(s) (e.g., any cash back balance). Accordingly, during the transaction completion stage 340, a GUI 342 may be presented on a computing device of an owner of an authorized credit card. The GUI 342 may present an account page 344, such as a web page providing information about the transaction account. The account page 344 may include customized content 346 of different types.

In one example type, the customized content 346 may show that an offer was selected and the benefit of this offer was added to the transaction account. In an example, the settlement process may include providing a code to the processor network 150 of FIG. 1 about the selected offer. In turn, the processing endpoint 156 of FIG. 1 may complete the settlement process based on this code and update the transaction account 154 of FIG. 1. Further, the content service 158 of FIG. 1 may present this type of customized content in the account web page 344 upon a login of the owner to the transaction account 154.

In another example type, the customized content may show branding content related to the membership status of the owner. In particular, a membership association may be pre-computed for the owner and may indicate his or her membership status based on an association of the owner account with the membership status. For instance, this pre-compute result may be stored in the membership associations 260 of FIG. 2. The membership status may be passed to the processor network 150 upon the pre-computation. The content service 158 may use the membership association to generate and present the branding content in the account page 344.

Figure 4:
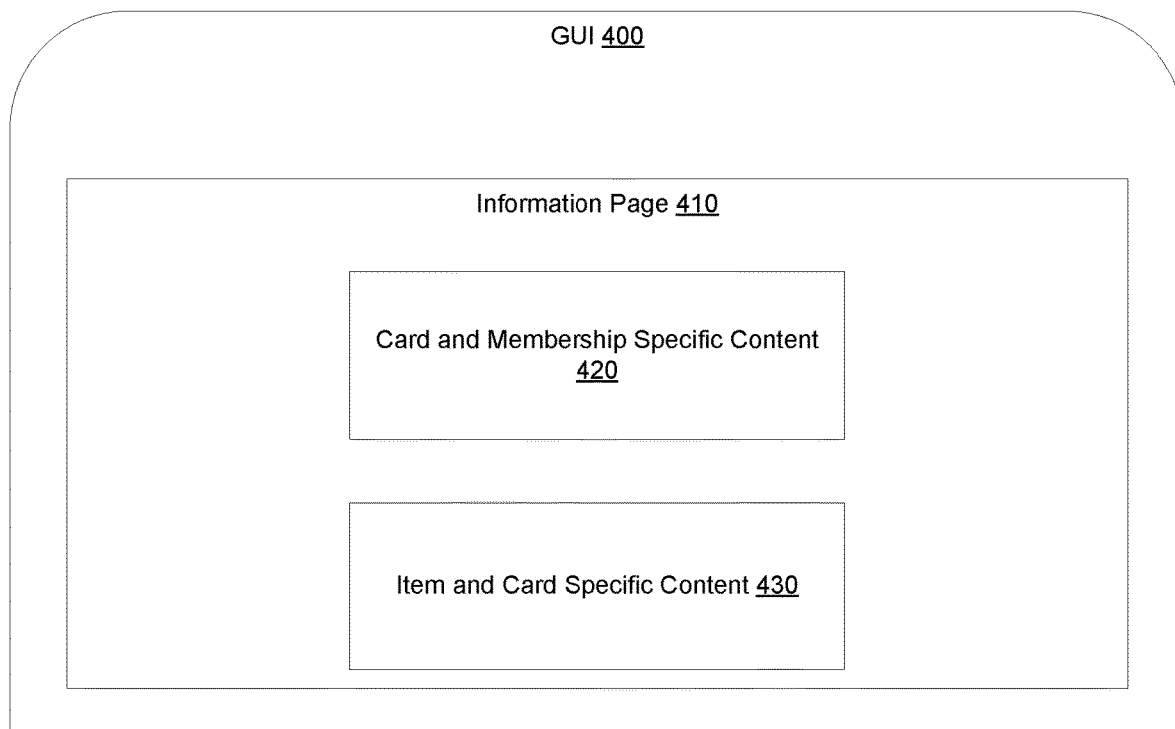
FIG. 4 illustrates an example of graphical user interface available during a browsing stage of a computing session, according to an embodiment of the present disclosure.

FIG. 4 illustrates an example of graphical user interface (GUI) 400 available during a browsing stage of a computing session, according to an embodiment of the present disclosure. In an example, the GUI 400 is presented on a computing device of an end user that has a user account. A credit card may be identified as being available for the user account, and an owner account of the credit card may be identified. The owner account may be the same as the user account if the end user claimed ownership of the credit card. The owner account may also or alternatively be another user account associated with an ownership claim of the credit card. A membership association of the owner account may be pre-computed and may indicate a membership status of the owner account. This membership status of the owner account may be used to customize the information page 410 presented in the GUI 400 to the end user.

In addition to presenting information about items, the information page 410 may present different types of customized content based on the membership status. In a first example, the customized content may include card and membership specific content 420. This content 420 may be targeted content informing the end user that the membership status is available for online transactions that involve a credit card from his or her user account and that the membership status may provide credit card benefits. For instance, the targeted content may be image and text describing to "use the credit card from your user account to receive five percent cash back because of its particular membership status."

In a second example, the customized content may include item and card specific content 430. This content 430 may be targeted content informing the end user of an offer specific to an item because of the membership status. For instance, the targeted content may be image and text describing to "use the credit card from your user account to receive ten percent off your purchase of product ABC."

Figure 5:
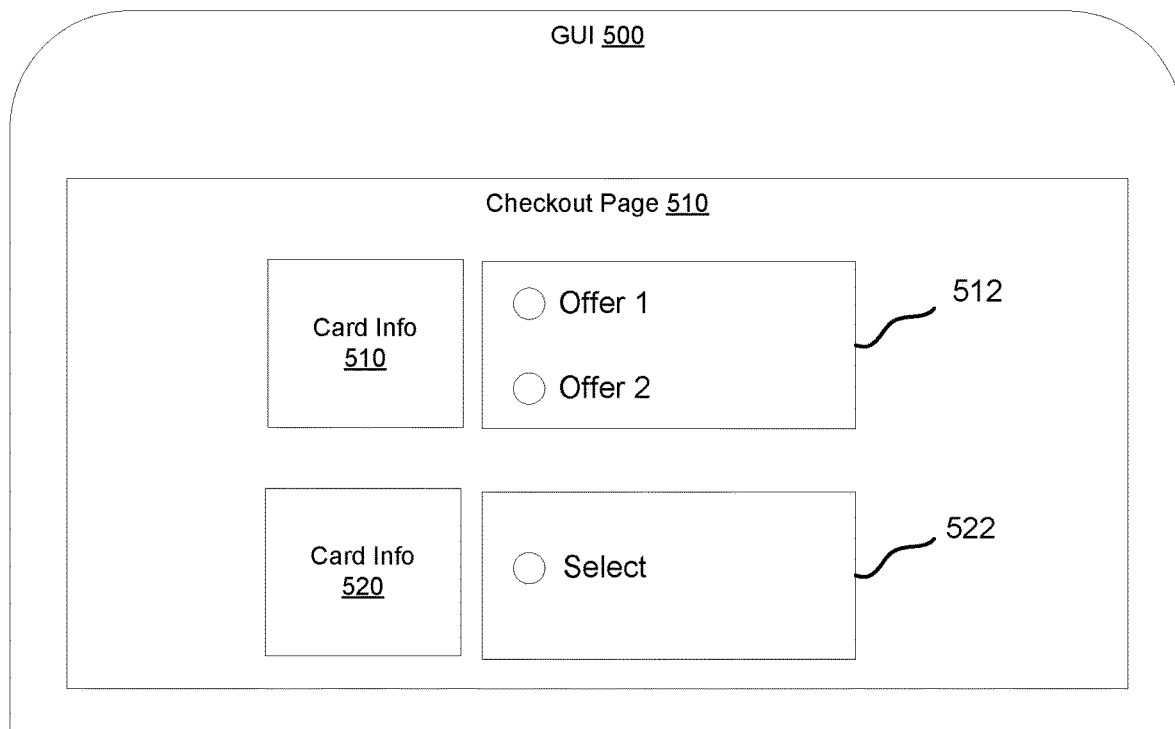
FIG. 5 illustrates an example of graphical user interface (GUI) 500 available during a checkout stage of a computing session, according to an embodiment of the present disclosure.

FIG. 5 illustrates an example of graphical user interface (GUI) 500 available during a checkout stage of a computing session, according to an embodiment of the present disclosure. In an example, the GUI 500 is presented on a computing device of an end user that has a user account. The end user may be logged in and authenticated based on the user account and may have initiated the checkout process to purchase items. A credit card may be identified as being available for the checkout based on the user account. An owner account of the credit card may be identified and the membership status of the owner account may be determined. An offer available for the credit card may be determined based on the membership status of the owner account and a qualification rule. That offer (available based on the ownership account, which could be different from the user account) may be used to customize the checkout page 510 presented in the GUI 500 to the end user. The relevant ownership object enables customization of the checkout page 510 with offers. Without such objects, the checkout page 510 just presents a generic indication of the available payment instruments (e.g., card brand name ending in 1234) without the offers.

The checkout page 510 may include fields that present information about a number of credit cards available for the online purchase. Information 510 and 520 about two credit cards are illustrated, although a different number of credit cards is possible depending on the number of credit cards associated with the user account. Each credit card information 510 and 520 can include, for instance, the last four numbers of the corresponding credit card, image of the credit card's owner, image of the issuing entity, and the like.

The checkout page 510 may also include fields that allow a user to select an available credit card to complete the online purchase. If a number of offers is available for a credit card, the corresponding field may provide information about each offer (e.g., receive five percent cash back, get ninety days deferred payment, etc.) and allow a selection of one of these offers and the credit card. This is illustrated under field 512, showing two offers for a first credit card and a selection option per offer (e.g., via a radial button). If no offer is available, the corresponding field may simply provide a selection option to choose the credit card. This is illustrated under field 522, showing a selection option of the credit card (e.g., via a radial button).

The checkout page 510 may include other fields (not shown) related to available offers. For instance, an offer may be available for a combination of a particular credit card and a particular item. Accordingly, given a membership status of an owner's of the particular credit card and if the particular item was added to the online cart, a qualification rule associated with the particular credit card may qualify the checkout of the particular item to receive the offer. In this case, the checkout page 510 may include fields specific to the particular item and particular credit card, where these fields may be shown as a separate line item in the checkout page 510. One of such fields may describe the particular credit card. Another one of such fields may describe the particular item. A further one of such fields may describe the offer and provide a selection option (e.g., a radial button) to select the offer and complete the online purchase of that particular item with the particular credit card. Another one of such fields may provide a second selection option to choose the particular credit card to purchase all remaining items in the online cart.

Figure 6:
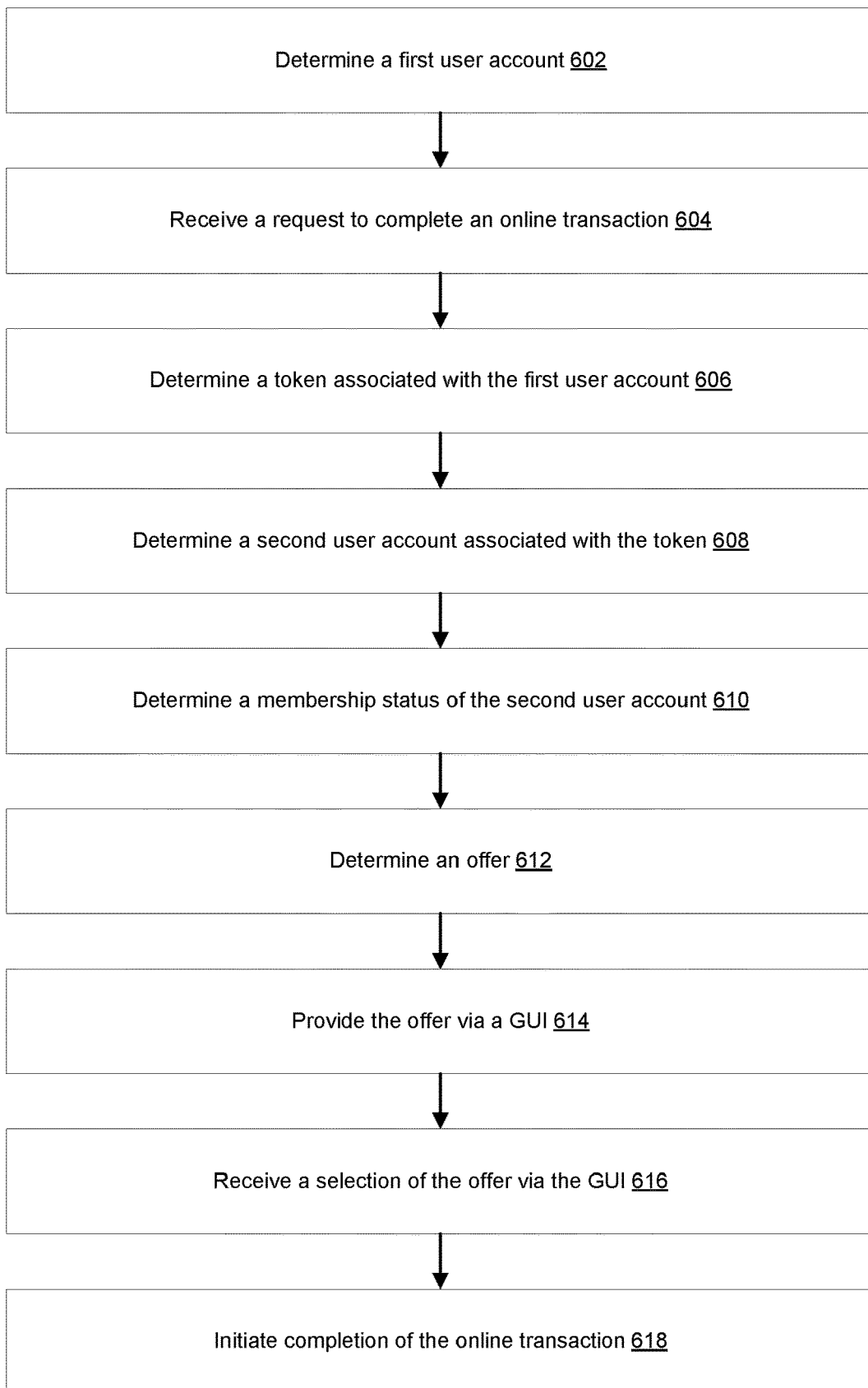
FIG. 6 illustrates an example of a flow for qualifying a transaction to an offer, according to an embodiment of the present disclosure.
Figure 7:
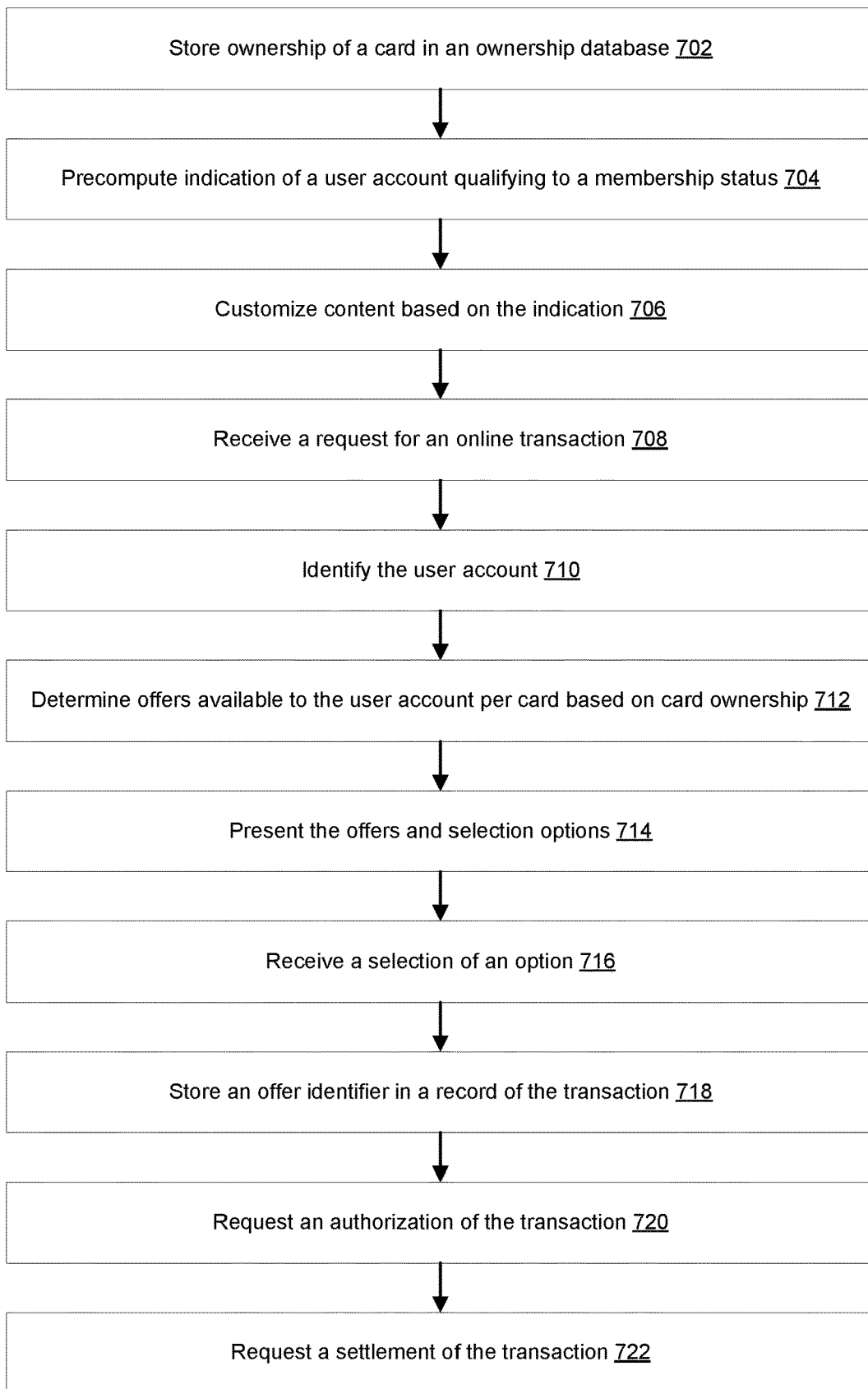
FIG. 7 illustrates a further example of a flow for qualifying a transaction to an offer, according to an embodiment of the present disclosure.

FIGS. 6-7 illustrate example flows for processing a transaction. Instructions for performing the operations of the flows can be stored as computer-readable instructions on a non-transitory computer-readable medium of a system. In an example, the system may include computing nodes of a transaction network of a service provider. As stored, the instructions represent programmable modules that include code or data executable by a processor(s) of the system. The execution of such instructions configures the system to perform the specific operations shown in the figures and described herein. Each programmable module in combination with the processor(s) represents a means for performing a respective operation(s). While the operations are illustrated in a particular order, it should be understood that no particular order is necessary and that one or more operations may be omitted, skipped, and/or reordered. In the interest of clarity of explanation, the flows are illustrated in connection with a credit card associated with an offer. However, the flows similarly apply to a larger number of credit cards, to a credit card associated with multiple offers, and/or to an offer associated with a particular credit card and a particular item. Also in the interest of clarity of explanation, the flows are illustrated in connection with a first user having a first user account registered with the system and associated with a credit card of a second user. The second user also has a second user account registered with the system, where this second user account is associated with an ownership object that identifies the credit card. In other words, while the first user may use the credit card for an online transaction, the second user may have claimed the ownership of this credit card. However, the flows similarly apply to the second user being the same as the first user.

FIG. 6 illustrates an example of a flow for qualifying a transaction to an offer, according to an embodiment of the present disclosure. The flow starts at operation 602, where the system may determine the first user account. For example, the system may provide checkout web page to a graphical user interface (GUI) of a user device of the first user. The first user may have logged in to his or her account via the GUI and may have been authenticated. The first user account may be determined based on the login.

At operation 604, the system may receive, from the user device based on the GUI, a request to complete an online transaction. In an example, the online transaction may include purchases of items virtually added to an online cart. The system may determine that the request is associated with the first user account based at least in part on the user authentication. This request may be received via one of the checkout web pages based on, or instance, a user selection of a presented GUI element to proceed to payment.

At operation 606, the system may determine, by the computer system from a user account database, a token associated with the first user account. In an example, the token corresponds to a transaction instrument (e.g., the credit card) associated with a transaction account that is registered with a processing endpoint. The token may have been generated by a tokenization engine of the system and may have been stored in the first user account in the user account database. Accordingly, the system may receive the token in a query result by using a user identifier of the first user account to query the user account database.

At operation 608, the system may determine, from an ownership database, a second user account associated with the token. In an example, the ownership database associates the token, the second user account, and the transaction account. For instance, the ownership database may include a database entry that stores the token, a user identifier of the second user account, and provider identifier of the transaction account, where this database entry may represent an ownership object. The system may receive the unique identifier of the second user account (and, thus, determine the second user account) in a query result by using the token to query the ownership database.

At operation 610, the system may determine, from a membership database, a membership status associated with the second user account. In an example, the system may receive the membership status of a query result by using the user identifier to query the membership database.

At operation 612, the system may determine a qualification of the second user account to receive an offer for selecting the transaction instrument (e.g., the credit card) to complete the online transaction. The offer is associated with an offer identifier. In an example, an offer database may store an offer associated with the token. A qualification rule may also specify that the offer may be available based on a particular membership status. Based on a match between the membership status determined at operation 610 and the specified membership status in the qualification rule, the system may determine the qualification. If qualified, the system may also determine an offer identifier of the offer, add the offer identifier to a record of the transaction, and translate the offer identifier to a code usable by the processing endpoint. The code may be subsequently used when the processing endpoint to apply the offer to the online transaction occurs.

At operation 614, the system may provide, based on the qualification and via the GUI of the user device, the offer and an option to select the transaction instrument in a checkout web page. In an example, the system may update the GUI such that the offer and the selection option may be presented in the checkout web page.

At operation 616, the system may receive, from the user device based on the GUI, a selection of the option. In an example, the system may receive the selection in response to user input in the GUI selecting the option presented in the checkout web page.

At operation 618, the system may initiate, based on the selection of the option, completion of the online transaction by using the token and the offer identifier. In an example, the online transaction may be first authorized by sending the provider identifier to the processing endpoint such that the transaction account could be identified and by requesting the processing endpoint to authorize the purchase based on the transaction account. Upon authorization, the transaction may be settled by also sending the provided identifier along with the code translated from the offer to the processing endpoint. Data about the authorization and the settlement may be stored in the record of the transaction.

FIG. 7 illustrates an example of a further flow for qualifying a transaction to an offer, according to an embodiment of the present disclosure. Some or all of the operations of the flow of FIG. 7 may be implemented as sub-operations of the flow of FIG. 6. Similarities between the two flows are not repeated herein.

The flow of FIG. 7 starts at operation 702, where the system may store ownership of the transaction instrument (e.g., the credit card) in the ownership database. In an example, the system provides a GUI to a user device to the second user. The GUI may include a sign up page presenting fields that allow the second user to claim the ownership. In response, the system may generate the ownership object storing the token, the unique identifier of the second user account, and the provider identifier. This object may be stored as a database entry in the ownership database.

Generating the ownership object (e.g., adding or updating the database entry) may be based on an addition rule defined by a provider of the system or a provider of the transaction account (e.g., an entity that manages the processing endpoint). The addition rule may limit a number of user accounts that can be associated with the credit card. When multiple user account are associated with the credit card in corresponding ownership objects (e.g., multiple ownership claims to the credit card exist), the qualification rule may set parameters to qualify the first user account to receive an offer available for the credit card. Some or all of these parameters may be set by the provider of the system and/or by the entity. In an example, the parameters specify a particular membership status and an OR operation. In other words, if any of the owner accounts (e.g., the user accounts identified in the ownership objects) has the particular membership status, the first user account may be qualified. In another example, the parameters specify a particular membership status and a hierarchy of the owner accounts. For instance, one owner account may be designated as a primary account and another owner account may be designated as a secondary account and both may have the particular membership status. According to the hierarchy, if the offer is to benefit the secondary account, the benefits of the offer may be relatively lower (e.g., decrease from five percent to three percent).

Claiming the ownership may be possible at different points. In one example, the ownership may be claimed as part of the second user requesting the credit card (e.g., a new credit card) and setting up (e.g., registering) the transaction account. In another example, the credit card may be an existing credit card and the ownership may be claimed as part of adding the credit card to the second user account for use by the second user or as part of merely associating the credit card with the second user account such that this credit card would become associated with the membership status of the second user account.

At operation 704, the system may precompute an indication of the first user account qualifying to the membership status. In an example, as soon as the first user adds the credit card to his or her first user account, the second system may use the different databases to identify that the second user account is already associated with the membership status and may, accordingly, generate a membership association of the first user account to the membership status (e.g., an indication that the first user account is associated with the membership status, although indirectly through the second user account).

This pre-computed result may be used internally by the system. For instance and as illustrated at operation 706, prior to the request for completing the transaction (e.g., during a browsing stage of the computing session), the system may customize content presented in a web page (e.g., in an information page) via the GUI of the user device based at least in part on the indication.

In addition, the system may precompute an indication that that the provider identifier of the second user account is associated with the membership status based on the second user account being associated with the prime membership. The system may provide the indication to a content service associated with the processing endpoint. This content service is configured to customize, based on the indication, content of a web page presenting information about the transaction account.

At operation 708, the system may receive the request for the online transaction. At operation 710, the system may identify the first user account. For example, the first user account may be identified based on the login to complete the online transaction.

At operation 712, the system may determine offers available to the user account per credit card based on the ownership(s) of the credit card(s) associated with the first user account. As explained herein above, the system may identify, from the first user account, the tokens corresponding to the credit cards, look-up the ownership objects, determine the owner accounts and their membership statuses, and apply the qualification rules to determine the offers.

At operation 714, the system may present the offers and the selection options. In an example, the system may update the GUI to identify in the checkout web page each credit card and, as applicable, each offer that was qualified for the credit, and a selection option.

At operation 716, the system may receive a selection of an option. This selection may correspond to one of the offers and the associated credit card. At operation 718, the system may store an offer identifier corresponding to the selected offer in a record of the transaction. For example, upon receiving the selection, the system may further process the online transaction. This further processing may include generating the record and storing the offer identifier therein. This offer identifier may identify the selected offer and credit card.

At operation 720, the system may request an authorization of the transaction from the processing endpoint. For example, the system may send, to the processing endpoint, the provider identifier corresponding to the transaction account of the selected account and identifiers of the total amount to be charged (absent the offer), the items or types of items, the first user account, and/or the second user account.

At operation 722, the system may request a settlement of the transaction from the processing endpoint. For example, upon authorization, the system may update the GUI to present a web page on the user device informing the user that the online purchase is authorized. Subsequently, the system may translate the offer identifier into a code and may send, to the processing endpoint, the provider identifier, total amount to be charged, and the code among other information to complete the settlement.

Figure 8:
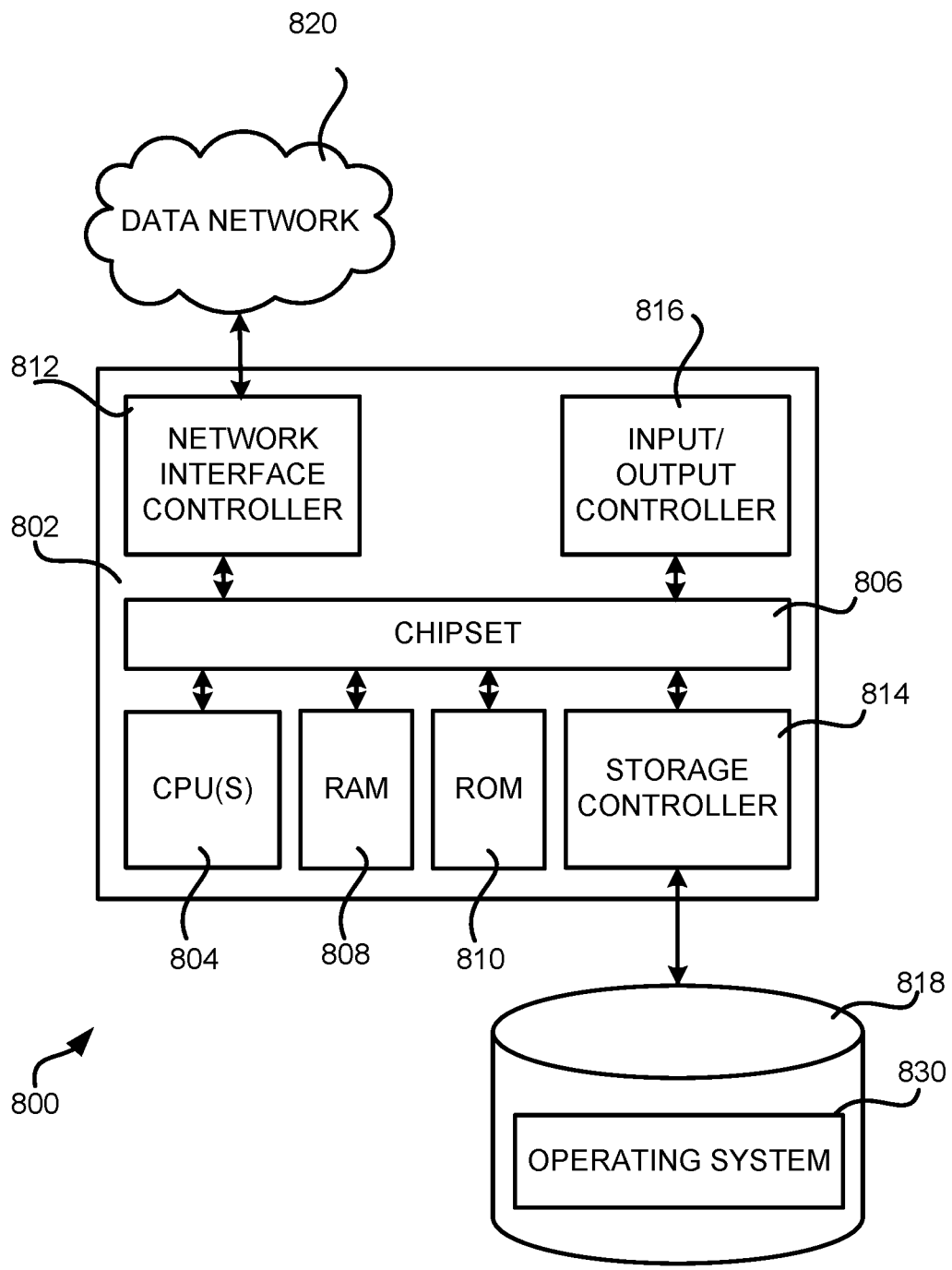
FIG. 8 illustrates a computer architecture diagram showing an example computer architecture, according to an embodiment of the present disclosure.

FIG. 8 illustrates a computer architecture diagram showing an example computer architecture, according to an embodiment of the present disclosure. This architecture may be used to implement some or all of the systems described herein. The computer architecture shown in FIG. 8 illustrates a conventional server computer, workstation, desktop computer, laptop, tablet, network appliance, personal digital assistant ("PDA"), e-reader, digital cellular phone, or other computing device, and may be utilized to execute any aspects of the software components presented herein.

The computer 800 includes a baseboard 802, or "motherboard," which is a printed circuit board to which a multitude of components or devices may be connected by way of a system bus or other electrical communication paths. In one illustrative embodiment, one or more central processing units ("CPUs") 804 operate in conjunction with a chipset 806. The CPUs 804 may be standard programmable processors that perform arithmetic and logical operations necessary for the operation of the computer 800.

The CPUs 804 perform operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 806 provides an interface between the CPUs 804 and the remainder of the components and devices on the baseboard 802. The chipset 806 may provide an interface to a random access memory ("RAM") 808, used as the main memory in the computer 800. The chipset 806 may further provide an interface to a computer-readable storage medium such as a read-only memory ("ROM") 810 or non-volatile RAM ("NVRAM") for storing basic routines that help to startup the computer 800 and to transfer information between the various components and devices. The ROM 810 or NVRAM may also store other software components necessary for the operation of the computer 800 in accordance with the embodiments described herein.

The computer 800 may operate in a networked environment using logical connections to remote computing devices and computer systems through a network, such as the local area network 820. The chipset 806 may include functionality for providing network connectivity through a NIC 812, such as a gigabit Ethernet adapter. The NIC 812 is capable of connecting the computer 800 to other computing devices over the network 820. It should be appreciated that multiple NICs 812 may be present in the computer 800, connecting the computer to other types of networks and remote computer systems.

The computer 800 may be connected to a mass storage device 818 that provides non-volatile storage for the computer. The mass storage device 818 may store system programs, application programs, other program modules, and data, which have been described in greater detail herein. The mass storage device 818 may be connected to the computer 800 through a storage controller 814 connected to the chipset 806. The mass storage device 818 may consist of one or more physical storage units. The storage controller 814 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 800 may store data on the mass storage device 818 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 818 is characterized as primary or secondary storage, and the like.

For example, the computer 800 may store information to the mass storage device 818 by issuing instructions through the storage controller 814 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 800 may further read information from the mass storage device 818 by detecting the physical states or characteristics of one or more particular locations within the physical storage units.

In addition to the mass storage device 818 described above, the computer 800 may have access to other computer-readable storage media to store and retrieve information, such as program modules, data structures, or other data. It should be appreciated by those skilled in the art that computer-readable storage media can be any available media that provides for the storage of non-transitory data and that may be accessed by the computer 800.

By way of example, and not limitation, computer-readable storage media may include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

The mass storage device 818 may store an operating system 830 utilized to control the operation of the computer 800. According to one embodiment, the operating system comprises the LINUX operating system. According to another embodiment, the operating system comprises the WINDOWS® SERVER operating system from MICROSOFT Corporation. According to further embodiments, the operating system may comprise the UNIX or SOLARIS operating systems. It should be appreciated that other operating systems may also be utilized. The mass storage device 818 may store other system or application programs and data utilized by the computer 800. The mass storage device 818 might also store other programs and data not specifically identified herein.

In one embodiment, the mass storage device 818 or other computer-readable storage media is encoded with computer-executable instructions which, when loaded into the computer 800, transforms the computer from a general-purpose computing system into a special-purpose computer capable of implementing the embodiments described herein. These computer-executable instructions transform the computer 800 by specifying how the CPUs 804 transition between states, as described above. According to one embodiment, the computer 800 has access to computer-readable storage media storing computer-executable instructions which, when executed by the computer 800, perform the various routines described above. The computer 800 might also include computer-readable storage media for performing any of the other computer-implemented operations described herein.

The computer 800 may also include one or more input/output controllers 816 for receiving and processing input from a number of input devices, such as a keyboard, a mouse, a touchpad, a touch screen, an electronic stylus, or other type of input device. Similarly, the input/output controller 816 may provide output to a display, such as a computer monitor, a flat-panel display, a digital projector, a printer, a plotter, or other type of output device. It will be appreciated that the computer 800 may not include all of the components shown in FIG. 8, may include other components that are not explicitly shown in FIG. 8, or may utilize an architecture completely different than that shown in FIG. 8. It should also be appreciated that many computers, such as the computer 800, might be utilized in combination to embody aspects of the various technologies disclosed herein.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method comprising:
   determining, by a computer system providing checkout web pages to a graphical user interface (GUI) of a user device, a first user account based at least in part on a user authentication via the GUI, the first user account registered with the computer system;
   receiving, by the computer system from the user device based at least in part on the GUI, a request to complete an online transaction, the request associated with the first user account based at least in part on the user authentication;
   determining, by the computer system from a user account database, a token associated with the first user account, the token corresponding to a transaction instrument associated with a transaction account that is registered with a processing endpoint;
   determining, by the computer system from an ownership database, a second user account associated with the token, the second user account registered with the computer system, the ownership database associating the token, the second user account, and the transaction account;

determining, by the computer system from a membership database, a membership status associated with the second user account;

determining, by the computer system from an offer database and based at least in part on a qualification rule, the token, and the membership status, a qualification of the second user account to receive an offer for selecting the transaction instrument to complete the online transaction, the offer associated with an offer identifier;

providing, by the computer system based at least in part on the qualification and via the GUI of the user device, the offer and an option to select the transaction instrument in a checkout web page;

receiving, by the computer system from the user device based at least in part on the GUI, a selection of the option; and initiating, by the computer system based at least in part on the selection of the option, completion of the online transaction by using the token and the offer identifier.

2. The computer-implemented method of claim 1, wherein the ownership database stores a database entry that associates the token, a user identifier unique to the second user account, and a provider identifier unique to the transaction account, and wherein the completion of the online transaction comprises:

determining a code corresponding to the offer identifier; and providing the provider identifier and the code to the processing endpoint.

3. The computer-implemented method of claim 2, further comprising:

generating, by the computer system and prior to receiving the request, an indication that the provider identifier is associated with the membership status based at least in part on the second user account being associated with the membership status; and providing, by the computer system, the indication to a content service associated with the processing endpoint, the content service configured to customize, based at least in part on the indication, content of a web page presenting information about the transaction account.

4. The computer-implemented method of claim 1, further comprising:

adding, by the computer system to the user account database, an association of the first user account with the token based at least in part on a request from the user device to add the transaction instrument to the first user account;

generating, by the computer system and prior to receiving the request, an indication that the first user account is associated with the membership status of the second user account based at least in part on the association of the first user account with the token; and customizing, by the computer system, content presented in a web page via the GUI of the user device based at least in part on the indication.

5. A system comprising:
one or more processors;
one or more memories storing computer-readable instructions that, upon execution by at least one of the one or more processors, configure the system to:

determine, upon providing checkout web pages to a graphical user interface (GUI) of a user device, a first user account based at least in part on a user authentication via the GUI, the first user account registered with the system;

receive, from the user device based at least in part on the GUI, a request to complete an online transaction, the request associated with the first user account based at least in part on the user authentication;

determine, from a user account database, a token associated with the first user account, the token corresponding to a transaction instrument associated with a transaction account that is registered with a processing endpoint;

determine, from an ownership database, a second user account associated with the token, the second user account registered with the system, the ownership database associating the token, the second user account, and the transaction account;

determine, from a membership database, a membership status associated with the second user account;

determine, from an offer database and based at least in part on a qualification rule, the token, and the membership status, a qualification of the second user account to receive an offer for selecting the transaction instrument to complete the online transaction, the offer associated with an offer identifier;

provide, based at least in part on the qualification and via the GUI of the user device, the offer and an option to select the transaction instrument in a checkout web page;

receive, from the user device based at least in part on the GUI, a selection of the option; and initiate, based at least in part on the selection of the option, completion of the online transaction by using the token and the offer identifier.

6. The system of claim 5, wherein the ownership database associates the token, a user identifier unique to the second user account, and a provider identifier unique to the transaction account, and wherein the completion of the online transaction comprises providing the provider identifier to the processing endpoint.

7. The system of claim 6, wherein the computer-readable instructions further configure the system to:

provide a second GUI that presents fields associated with setting up the transaction account; and update the ownership database by adding a database entry that stores the token, the user identifier, and the provider identifier based at least in part on user input at the second GUI.

8. The system of claim 6, wherein the computer-readable instructions further configure the system to:

provide a second GUI that presents fields associated with adding the transaction instrument to the first user account; and update the ownership database by adding a database entry that stores the token, the user identifier, and the provider identifier based at least in part on user input at the second GUI.

9. The system of claim 8, wherein the computer-readable instructions further configure the system to:

receive, from the processing endpoint, information about a new transaction instrument associated with the transaction account; and update the database entry to store a new token associated with the new transaction instrument, the user identifier, and the provider identifier.

10. The system of claim 8, wherein the computer-readable instructions further configure the system to:
- receive subsequent user input to add the transaction instrument to another user account; and
- update the ownership database by adding a second database entry that stores the token, another user identifier unique to the other user account, and the provider identifier based at least in part on the subsequent user input.

11. The system of claim 10, wherein the second database entry is added based at least in part on an addition rule defined by at least one of a provider of the system or a provider of the transaction account, wherein the addition rule limits a number of user accounts that can be associated with the transaction instrument.

12. The system of claim 5, wherein the qualification rule qualifies the second user account to receive the offer based at least in part on either a membership status of the first user account or the membership status of the second user account.

13. The system of claim 8, wherein the computer-readable instructions further configure the system to:
- receive subsequent user input to add a second transaction instrument to the second user account, the second transaction instrument corresponding to the transaction account; and
- update the ownership database by adding a second database entry that stores a second token corresponding to the second transaction instrument, the user identifier, and the provider identifier based at least in part on the subsequent user input.

14. A non-transitory computer-readable storage medium storing instructions that, upon execution on a computer system, cause the computer system to perform operations comprising:
- determining, upon providing checkout web pages to a graphical user interface (GUI) of a user device, a first user account based at least in part on a user authentication via the GUI, the first user account registered with the computer system;
- receiving, from the user device and based at least in part on the GUI, a request to complete an online transaction, the request associated with the first user account based at least in part on the user authentication;
- determining, from an user account database, a token associated with the first user account, the token corresponding to a transaction instrument that is associated with a transaction account registered with a processing endpoint;
- determining, from an ownership database, a second user account associated with the token the second user account registered with the computer system, the ownership database associating the token, the second user account, and the transaction account;
- determining, from a membership database, a membership status associated with the second user account;
- determining, from an offer database and based at least in part on a qualification rule, the token and the membership status, a qualification of the second user account to receive an offer for selecting the transaction instrument to complete the online transaction, the offer associated with an offer identifier;
- providing, based at least in part on the qualification and via the GUI of the user device, the offer and an option to select the transaction instrument in a checkout web page;
- receiving, from the user device based at least in part on the GUI, a selection of the option; and
- initiating, based at least in part on the selection of the option, completion of the online transaction by using the token and the offer identifier.

15. The non-transitory computer-readable storage medium of claim 14, wherein the request is received based at least in part on a login with the first user account via the GUI, and further comprising:
- prior to receiving the request, storing an indication that the first user account is associated with the membership status of the second user account based at least in part on an association of the first user account with the token; and
- customizing content presented via the GUI based at least in part on the indication.

16. The non-transitory computer-readable storage medium of claim 15, wherein customizing the content comprises:
- determining a specific offer available for an item based at least in part on a use of the transaction instrument; and
- updating the content to include the specific offer.

17. The non-transitory computer-readable storage medium of claim 14, wherein the offer is further determined based at least in part on a first identifier of a first item, and further comprising:
- determining, based at least in part on the token, the membership status, and a second identifier of a second item, a second qualification of the second user account to receive a second offer specific to the second item, wherein updating the GUI comprises presenting the second offer.

18. The non-transitory computer-readable storage medium of claim 14, wherein the operations further comprise:
- updating the GUI of the user device by presenting the offer and the option to select the transaction instrument to complete the online transaction.

19. The non-transitory computer-readable storage medium of claim 14, wherein the ownership database associates the token, a user identifier unique to the second user account, and a provider identifier unique to the transaction account, and wherein the completion of the online transaction comprises:
- generating a record of the online transaction, the record storing the offer identifier; and
- requesting, from the processing endpoint, an authorization of the online transaction based at least in part on the provider identifier.

20. The non-transitory computer-readable storage medium of claim 19, wherein the completion of the online transaction further comprises:
- translating, based at least in part on receiving the authorization from the processing endpoint, the offer identifier into a code usable by the processing endpoint; and
- requesting, to the processing endpoint, to update the transaction account based at least in part on the provider identifier and the code.

* * * * *